April 28, 1925.
E. E. BEARD
1,535,091
STEREOTYPE MOLD
Filed Jan. 5, 1923
2 Sheets-Sheet 1
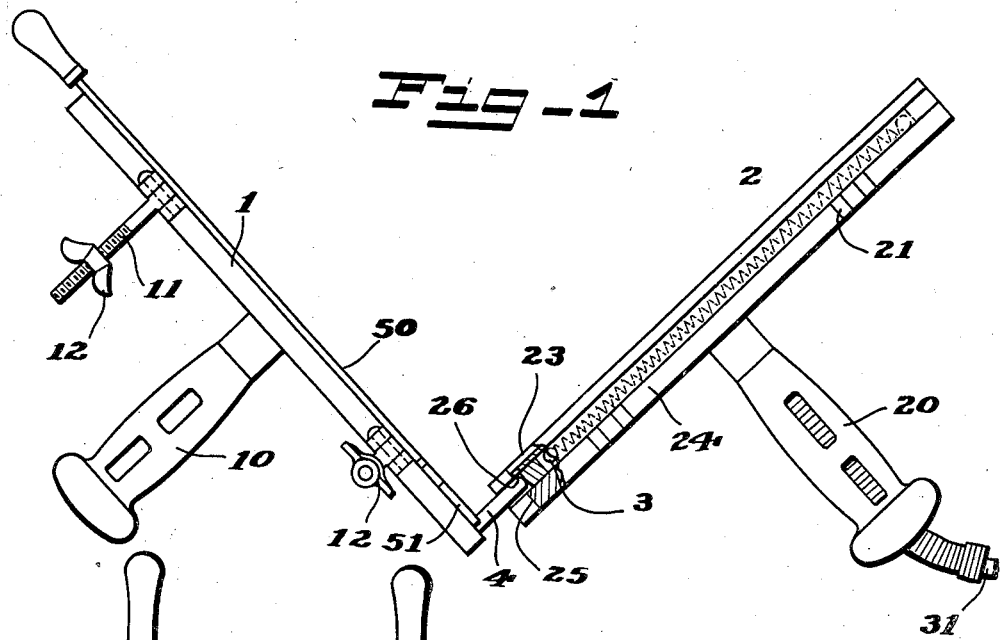
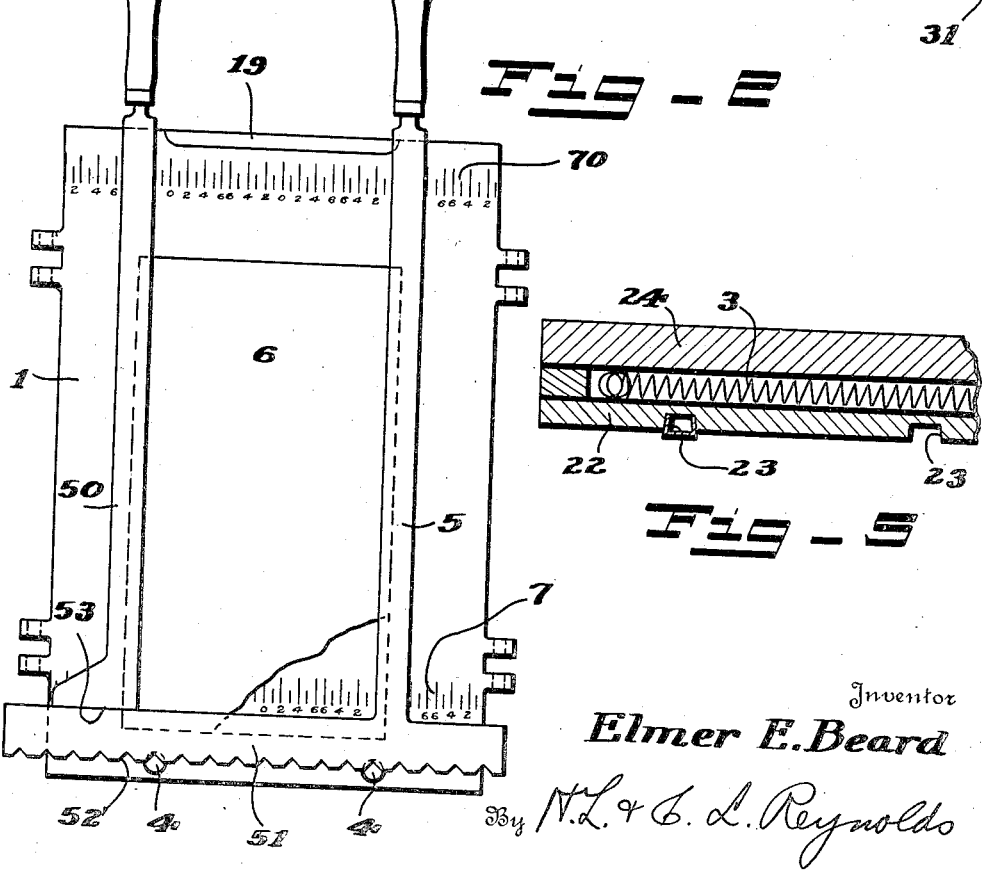
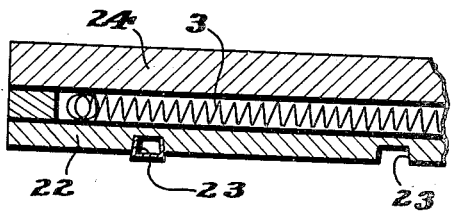
Inventor
Elmer E. Beard
By N. L. & C. L. Reynolds
Attorneys April 28, 1925.  E. E. BEARD  1,535,091
STEREOTYPE MOLD
Filed Jan. 5, 1923    2 Sheets-Sheet 2
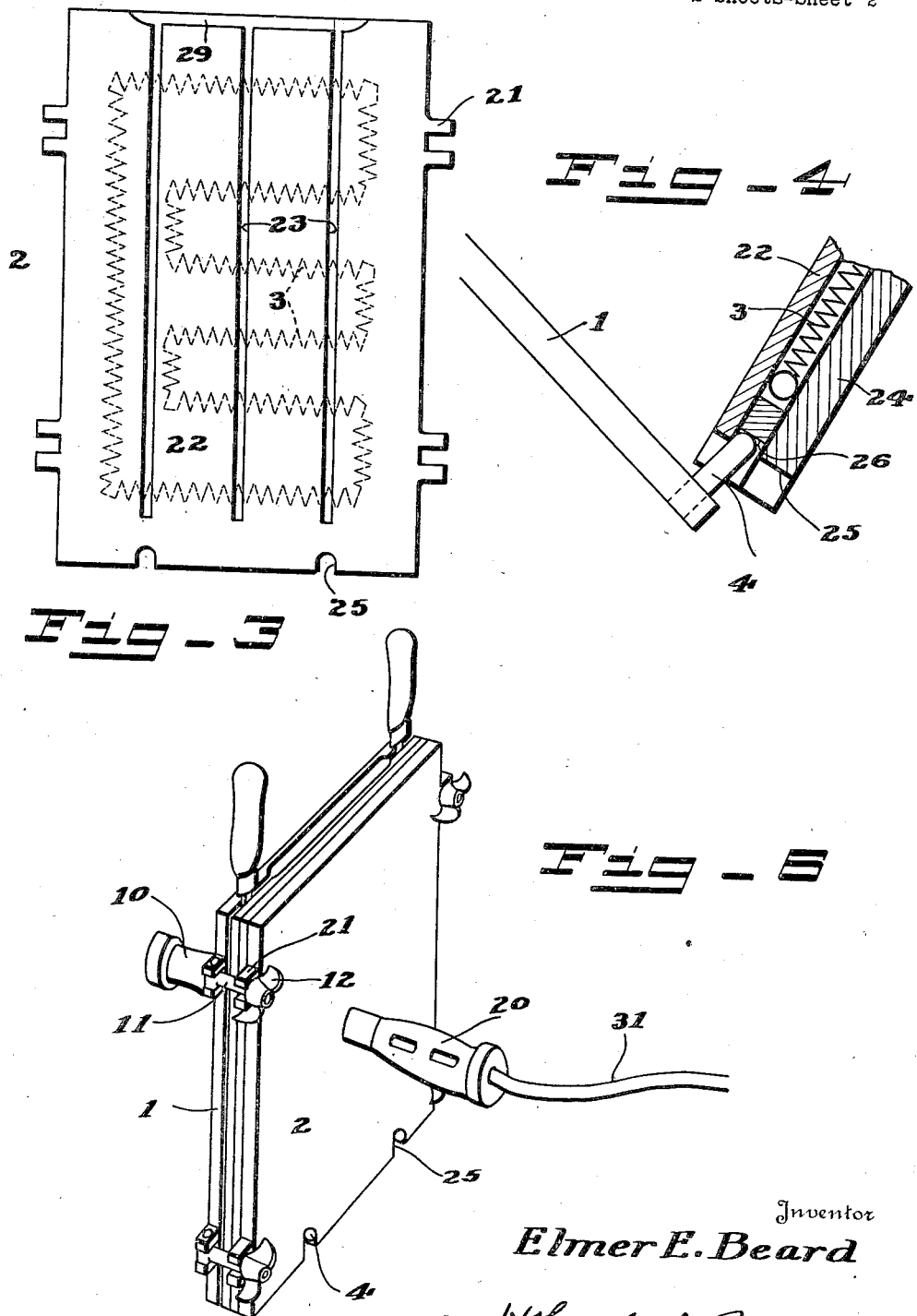
Inventor
*Elmer E. Beard*

Patented Apr. 28, 1925.

1,535,091

UNITED STATES PATENT OFFICE.

ELMER E. BEARD, OF PORT ANGELES, WASHINGTON.

STEREOTYPE MOLD.

Application filed January 5, 1923. Serial No. 610,931.

*To all whom it may concern:*

Be it known that I, ELMER E. BEARD, a citizen of the United States of America, and resident of the city of Port Angeles, in Clallam County, State of Washington, have invented certain new and useful Improvements in Stereotype Molds, of which the following is a specification.

My invention relates to stereotype molds such as are designed for use in small shops. While my invention is particularly intended for making cuts in the manner described in my companion application for an improvement in stereotype plates and supports therefor, yet it may be employed to advantage in making stereotype plates of different forms and according to other methods.

It is a particular object of my present invention to provide a mold by means of which a cut may be quickly produced, by the elimination of the usual step of making a blank cast in order to heat up the mold.

A further object is the provision of a compact and convenient mold for the purpose intended, and particularly for use in small shops which have no stereotype casting facilities but do have linotype machines.

A further object is the provision in connection with such a mold, of side sticks which are employed for defining the outlines of a cut and which may be maintained in proper spaced relationship to each other and to grooves provided in the mold, and which may also be maintained in parallelism with such grooves.

A further object is the provision of means in such a two-part mold whereby the two parts may be pivoted and swung one toward the other until the plates are substantially parallel but separated, and which will then permit bodily movement of the swinging plate directly toward the stationary plate.

Other objects may be determined from a study of the specification and of the claims terminating the same, and of the drawings attached hereto.

My invention comprises those novel parts and combinations thereof which are shown in the accompanying drawings, described in the specification and particularly defined by the claims terminating the same.

In the accompanying drawings I have shown my invention in the form which is now preferred by me.

Figure 1 is a side elevation of my mold in open position.

Figure 2 is an elevation of one of the mold parts, illustrating particularly the means for maintaining the side sticks in position, and Figure 3 is a similar elevation of the complemental mold part.

Figure 4 is a section through the pivot joint between the two mold parts.

Figure 5 is a section through the electrically heated mold part.

Figure 6 is a perspective of the mold complete and in closed position.

Stereotype molds for making flat plates are commonly formed in two parts which are generally hingedly secured together. In order to prepare the mold for casting a cut it is necessary first to heat the mold, for otherwise the metal will not flow properly and the cut will be defective. In ordinary practice the mold is heated by making a blank cast, that is, by pouring molten metal into the mold before inserting the mat from which the cut is to be made. The cut is then made by inserting the mat while the mold is hot, and again pouring the molten metal. This process consumes considerable time, and if the mat for a cut is received just prior to time for closing the forms it is not possible to have the cut made in time. It is one of the objects of my invention to enable the printer to make cuts more rapidly, without previously casting a blank cast, and thus to save time in the making of the cut, and incidentlly the expense of heating the metal required for the blank cast.

My invention is particularly designed for a certain class of newspaper offices which do not have a regular stereotyping outfit, but which are apt to have linotype or analagous type casting machines. It is one of the chief purposes of my invention to provide an apparatus which may be used to quickly make one or a few stereotype plates when the occasion arises, using metal from the pot of the linotype machine, thus avoiding the necessity of having to keep a special melting pot and the time required to heat it up.

As a linotype machine will work successfully only when the temperature of the metal is so little above the melting point of the metal, when metal of this temperature is poured into a mold of such size as is required for even a small cut, it will set before the mold is filled, unless the mold is first heated to or quite near to the melting point of the type metal.

To so heat the mold from the pot of a linotype machine by making a blank cast is impractical, because the metal therein has little excess temperature and the metal is small in amount. To obviate both of these difficulties I provide means for independently heating the mold so that it may be quickly brought to the temperature at which the type metal melts. With the metal of the mold at or near the temperature at which the type metal melts, either a little above or below, the metal will flow freely and fill out every line of the mold. Even if the mold is slightly above the melting point of the type metal, it will cool quickly to a temperature at which setting of the type metal occurs.

To promptly secure this result I provide that side of the mold which directly contacts with the metal in casting, with an electric heating element or elements so disposed and distributed about the entire surface thereof as to evenly heat it to the desired temperature. By doing this metal for making the plate may be drawn directly from the melting pot of the linotype machine and a sharp cast secured.

The mold which I have shown herein comprises two separable parts 1 and 2. The part 1 is provided with a handle 10 and the part 2 likewise has a similar handle 20, these acting also as supports to maintain the two mold parts in inclined position when open. Means, which will be described in detail hereinafter, are provided for hinging and positioning the two mold parts relative to each other. I have also provided means for clamping together the two parts, the means shown herein consisting of bolts 11 pivoted at the edges of the mold part 1 and having wing nuts 12 thereon, the wing nuts 12 being engageable with slotted ears 21 at the edges of the part 2. This will be clear from Figure 6. Obviously, any suitable clamping means may be employed.

The mold part 2 comprises an inner plate 22 having a series of vertically extending grooves 23 therein, an outer plate 24 and a suitably insulated electrical heating element 3 positioned between the plates 22 and 24, and thus embedded within the mold part 2. I have shown lead wires 31 extending through the handle 20 to connect with the element 3.

In order to permit pivoting or swinging of the part 2 relative to the part 1 until the part 2 is over the part 1 but separated therefrom, and then to permit movement of the part bodily toward the part 1, and also to permit separation of the parts 1 and 2 without inconvenient disengagement of hinge elements, I have provided the peculiar pivot which I shall now describe. Projecting from one of the parts, as the part 1, along its bottom edge and toward the other part 2, are a series of pins 4. I have shown two such pins, although it will be evident that more may be employed if necessary or desirable. The mold part 2 is provided with slots 25 which are complemental to the pins 4 and which cooperate therewith to position the mold parts 2 accurately relative to the part 1. The bottoms of the slots 25 however, do not run straight but are recessed, as is indicated at 26.

When the two mold parts are swung open the part 2 is lifted slightly until the end of the pin 4 is received in the recess 26 of its slot 25. The part 2 will then swing upon the pivot thus formed between the end of the pin 4 and the recess 26, and the pin 4 will remain in the recess unless the mold parts are separated by moving one or the other bodily away from the complemental part. When swinging back into closed position, however, the mold part 2 will pivot on the end of the pin 4 as has been described, but when the two mold parts are substantially parallel but separated, the end of pin 4 will slip from the recess 26 and the mold part 2 will be moved bodily toward the mold part 1. The pins 4 will then serve to guide the parts together and to accurately position them.

The pivot construction and method of support described serves another useful purpose. It will be noted that the mold part 2 which contains the electric heating element 3 is normally supported, when open, upon the points of the two pins 4, and upon the handle 20, which is long, and which is perforated to reduce the weight of metal. The loss of heat by conduction is thus almost entirely eliminated, and heating of the mold part 2 is greatly facilitated. Danger of fire through neglect of a heating mold is also lessened.

The pins 4 may be made to serve another function, that is, to position side sticks 5 and 50 accurately relative to the position of one or more of the grooves 23, and to maintain the side sticks 5 parallel to each other and to the grooves 23. The side stick 5 is provided with a foot 51 extending laterally at right angles thereto upon one or both sides. The side stick itself holds down an edge of the mat 6 and defines one side edge of the cut. The foot 51 holds down the bottom of the mat and defines the bottom edge of the cut. It is provided preferably with a series of notches 52, these being spaced a distance equal to one em or a multiple thereof. By engaging these notches 52 with the pins 4, the pins being ridged if desired to properly engage the notches, the side stick 5 may be accurately positioned laterally of the mold and it is maintained by its engagement with the two pins 4 in strict parallelism with the positions of the grooves 23. The side stick 50 which defines the other side of the cut may also have a foot with a bottom edge 53 at right angles to its side edge. This edge 53, riding upon the top of the foot 51, maintains the stick 50 parallel to the stick 5.

I have shown a scale 7 divided into ems at the bottom of the mold part 1, and numbered from each side of a column space, this serving as a gage to position the side sticks 5 and 50. A like scale 70 at the upper edge of the mold part 1 cooperates with the scale 7 and assists in more accurately positioning the side sticks 5 and 50. The grooves 23 are preferably spaced 12½ ems, and are themselves ½ em in width, and are positioned at the zero marks of the scales 7 and 70. Knowing this, the position of ribs on the finished cut plate may be accurately determined. I have shown the upper inner corner of the mold parts 1 and 2 beveled as indicated at 19 and 29 to provide a trough into which the molten metal may be poured more easily than into the narrow space between the mold parts.

A mat is placed upon plate 1 and the side sticks 5 and 50 and the foot 51 placed thereon to outline the edges of the cut. The side sticks are at this time set at the proper distance apart and at the proper distance from the positions of one or more of the grooves 23, as may be determined by reference to the scales 7 and 70. In this manner the width of the cut is determined, and also the position thereon of the securing ribs formed by the grooves 23. The mold is then closed by swinging the mold part 2 toward the mold part 1 as has been described, and the two parts are clamped together. Prior to this the mold part 2 should have been heated, by application of current to the element 3. When the temperature of the mold is sufficiently high the molten metal is poured thereinto, the electric current through the element 3 having been turned off. As soon as the cut is sufficiently cool it may be removed from the mold and trimmed. It will be seen, thus, that the operation of casting a cut is simple, requires but little time and the equipment necessary is simple and relatively inexpensive.

What I claim as my invention is:

1. A stereotype mold including two separable parts, means for clamping together said two parts, and pins projecting from one part along its lower edge towards the second part, said second part having notches in its lower edge for the reception of said pins.

2. A stereotype mold including two separable parts, and means for guiding one part into position upon the other part comprising pins projecting from the inner face of the stationary mold part along its lower edge towards the other part, and said moving part having complemental pin-receiving notches in its lower edge, the bottoms of said notches being recessed to receive the end of the pin as a pivot until said mold parts are substantially parallel, and with their inner faces separated, and pins and notches thereafter acting to guide the moving plate for movement bodily towards the stationary plate.

3. In combination with a two-part stereotype mold, one of said parts having rib-forming grooves therein, and having positioning pins projecting therefrom along its lower edge towards the other mold part, a side stick defining a side edge of a cut, and having a foot extending at right angles from its lower end to define the bottom edge of a cut, the lower edge of said foot having means cooperating with said pins to position said side stick at a predetermined distance from a groove and parallel thereto, a second side stick defining the other side of a cut, and means for maintaining said side sticks in parallelism.

4. In combination with a two-part stereotype mold, one of said parts having vertically-extending rib-forming grooves therein, and having positioning pins at its lower edge projecting therefrom towards the complemental mold part, a side stick defining a side edge of a cut, and having a foot extending at right angles from its lower end to define the bottom edge of the cut, the lower edge of said foot having notches engageable with said pins to maintain said side stick parallel with a groove in the mold part and at a predetermined distance therefrom, and means for defining the other side edge of a cut.

Signed at Port Angeles, Clallam County, Washington December 1922.

ELMER E. BEARD.